United States Patent [19]

Wright

[11] 4,420,212
[45] Dec. 13, 1983

[54] POLARITY INDICATING BATTERY BOOSTER CABLE ASSEMBLY

[75] Inventor: Bruce R. Wright, St. Louis, Mo.

[73] Assignee: Associated Equipment Corporation, St. Louis, Mo.

[21] Appl. No.: 429,471

[22] Filed: Sep. 30, 1982

Related U.S. Application Data

[63] Continuation of Ser. No. 186,455, Sep. 12, 1980, abandoned, which is a continuation-in-part of Ser. No. 158,681, Jun. 12, 1980.

[51] Int. Cl.³ ............................................ H01R 11/22
[52] U.S. Cl. ............................... 339/113 L; 339/29 B
[58] Field of Search ..................... 339/28, 29 B, 113 L

[56] References Cited

U.S. PATENT DOCUMENTS

| | | | |
|---|---|---|---|
| 3,936,121 | 2/1976 | Leinberger | 339/29 B |
| 4,145,648 | 3/1979 | Zender | 339/29 B X |
| 4,166,241 | 8/1979 | Grant | 339/29 B X |
| 4,238,722 | 12/1980 | Ford | 339/29 B X |
| 4,272,142 | 6/1981 | Zapf | 339/29 B X |
| 4,349,774 | 9/1982 | Farque | 339/29 B X |

*Primary Examiner*—Eugene F. Desmond
*Attorney, Agent, or Firm*—Cohn, Powell & Hind

[57] ABSTRACT

A polarity indicating battery booster assembly including a pair of booster wires with a first pair of battery clamps connected on one end and a second pair of battery clamps connected at the other end. A first light is connected to the pair of wires for indicating one polarity of connection of the first pair of battery clamps while a second light is connected to each of the wires for indicating the opposite polarity of connection of the first pair of battery clamps. Additional first and second lights are provided for determining the polarity of connection of the second pair of battery clamps. One of the second pair of battery clamps carries an electrical probe for checking polarity of that clamp. The first lights are green light-emitting diodes, and the second lights are red light-emitting diodes.

7 Claims, 2 Drawing Figures

POLARITY INDICATING BATTERY BOOSTER CABLE ASSEMBLY

CROSS-REFERENCE TO RELATED APPLICATION

This application is a continuation, of application Ser. No. 186,455, filed Sept. 12, 1980, now abandoned, which application is a continuation-in-part of co-pending application Ser. No. 158,681, filed June 12, 1980.

BACKGROUND OF THE INVENTION

This invention relates to battery booster cables in general, and particularly to battery booster cables having means for indicating the polarity of connection prior to making final connection of the booster cables.

Booster cables are used for starting vehicles which have partially discharged batteries and are therefore not capable of starting the vehicles themselves. Typically, a booster cable is attached to an adequately charged battery and to the partially discharged battery of the vehicle to be started. Normally, the person connecting the booster cables determines the polarity of connection of the cables by observing the polarity designations on the batteries of the vehicles. Sometimes it is difficult to observe the polarity of the batteries because of corrosion and dirt on the batteries or because of darkness such as when utilized at night. It is important that proper polarity of connection be observed in order to avoid the arcing, high battery current, generation of explosive gases and possible battery explosion, which occur when batteries are reversed connected.

SUMMARY OF THE INVENTION

This polarity indicating battery booster cable assembly provides indicating means for indicating the polarity of connection of the booster cables to a first battery, and provides means including a test probe for determining the proper polarity of connection of the second battery attachment means before connecting to a second battery.

The assembly includes a pair of booster wires having first and second ends. First battery attachment means are connected to the first ends of the pair of booster cables, and first indicating means are operatively connected to the first battery attachment means for indicating the polarity of connection of the first battery attachment means.

Second battery attachment means are connected to the second ends of the pair of booster wires. A second indicating means is operatively connected to one of the booster wires and includes a test probe for determining the proper polarity of connection of the second battery attachment means.

In one aspect of the invention, the first indicating means includes a first light for indicating proper polarity connection of the first battery attachment means and a second light for indicating improper polarity of connection of the first battery attachment means. The second indicating means includes a first light for determining proper polarity of connection of the second battery attachment means and a second light for determining the improper polarity of connection of the second battery attachment means.

In another aspect of the invention, the second battery attachment means includes a first battery clamp connected to one of the booster wires and a second battery clamp connected to the other booster wire. The second battery clamp carries a test probe. In another aspect of the invention, the test probe includes an electrically conductive terminal electrically connected to the second indicating means and electrically isolated from the second battery clamp. The second indicating means includes a tracer lead electrically connected to the test probe conductive terminal. In one aspect of the invention, the tracer lead is carried by the other booster wire. In yet another aspect of the invention, the other booster wire is the negative wire.

In one aspect of the invention, the housing means is attached to the pair of booster wires. The first and second lights are carried by the housing means. In another aspect of the invention, the first lights are green light-emitting diodes and the second lights are red light-emitting diodes.

DESCRIPTION OF THE PREFERRED EMBODIMENT

Figure 1:
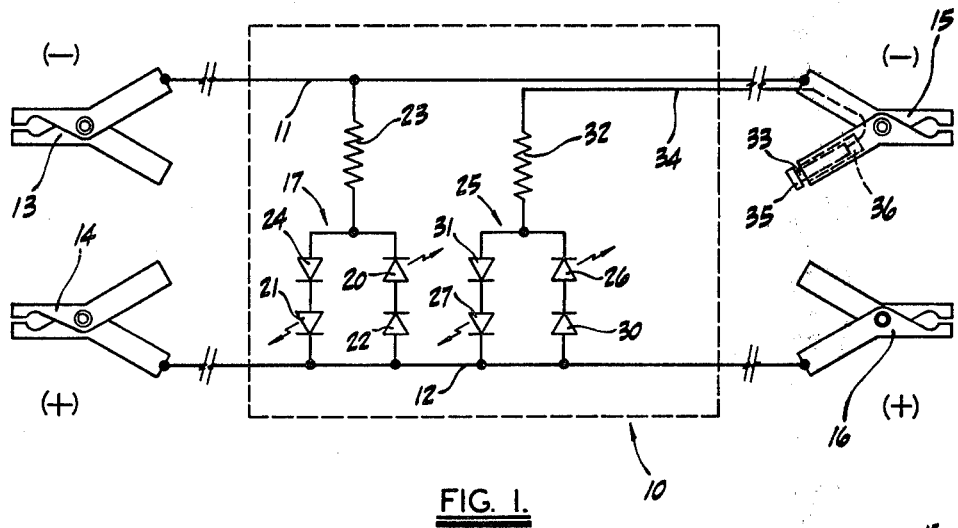
FIG. 1 is an electrical schematic view of the polarity indicating battery booster cable assembly.

Referring now by characters of reference to the drawings, it will be understood that the battery booster cable assembly generally indicated by 10 includes a first booster wire 11, and a second booster wire 12 comprising a pair of booster wires. Connected to a first end of the booster wires 11 and 12 are battery clamps 13 and 14 which comprise first battery attachment means. Connected to the second end of the booster wires 11 and 12 are battery clamps 15 and 16 which comprise a second battery attachment means.

First indicating means indicated generally by 17 is electrically connected between the booster wires 11 and 12. The first indicating means 17 includes a green light-emitting diode (LED) 20 constituting a first light for indicating proper polarity of connection, and a red light-emitting diode (LED) 21 constituting a second light for indicating improper polarity of connection of the battery clamps 13 and 14.

The green LED 20 is serially connected with a protection diode 22 which protects the LED 20 from high reverse voltages, and a current limiting resistor 23 between the booster wires 12 and 11 in a manner such that the green LED 20 will light when the battery clamp 14 is connected to a positive terminal and a battery clamp 13 is connected to a negative terminal of a battery. The red LED 21 is serially connected with a protection diode 24 and the voltage-dropping resistor 23 across booster wires 11 and 12 in a manner such that the red LED 21 will light when the battery clamp 13 is connected to the positive terminal and the battery clamp 14 is connected to the negative terminal of a battery.

A second indicating means indicated generally by 25 includes a green LED 26 constituting a first light, a red LED 27 constituting a second light, protection diodes 30 and 31 and a voltage-dropping resistor 32 interconnected in the same manner as the first indicating means 17. The second indicating means 25 is connected between the booster wire 12 and a test probe 33 by a tracer lead 34. The second indicating means 25 is connected in a manner so that the green LED 26 will light when the battery clamp 16 is connected to the positive terminal and the test probe 33 is connected to a negative terminal of a battery, and the red LED 27 will light when the battery clamp 16 is connected to a negative terminal and the test probe 33 is connected to a positive terminal of a battery.

Figure 2:
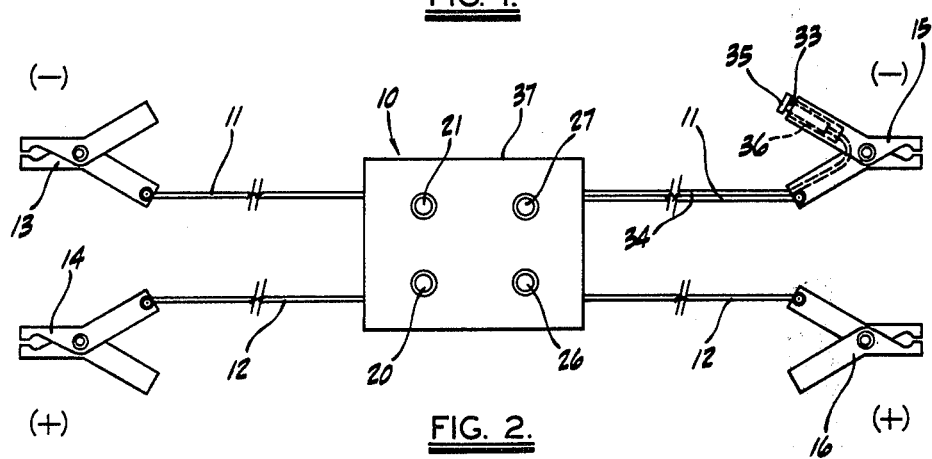
FIG. 2 is a diagrammatic view of the polarity indicating battery booster cable assembly.

As indicated in FIG. 2, a housing 37 holds or carries the first and second indicating means 17 and 25 with the LEDS 20, 21, 26 and 27 being visible, through the housing. The booster wires 11 and 12 are attached and pass through the housing 35. The tracer lead 34 is attached to the booster wire 11 between the housing 37 and the clamp 15. The probe 33 includes an electrically conductive terminal 35 attached to the tracer wire 34, and an insulated sleeve 36 carried by the clamp 15. The clamp 15 carries the probe 33 in a manner to electrically isolate the conductive terminal 35 of the probe 33 from the clamp 15.

It is thought that the structural features and functional advantages of the polarity indicating battery booster cable assembly has become fully apparent from the foregoing description of parts but for completeness of disclosure the operation of the assembly will be briefly discussed.

It is of course understood that the booster cable assembly 10 is used to interconnect two batteries (not shown). When interconnecting the batteries, the battery clamps 13 and 14 are first connected to the terminals of one of the batteries. If the clamps 13 and 14 are properly connected to the battery, that is, the clamp 14 being connected to the battery positive terminal and the clamp 13 being connected to the battery negative terminal, the green LED 20 will light, thereby indicating proper polarity of connection of the booster wires 11 and 12. However, if the battery clamps 13 and 14 are improperly connected, that is, the clamp 13 is connected to the battery positive terminal and the clamp 14 is connected to the battery negative terminal, the red LED 21 will light, thereby indicating that the booster wires 11 and 12 are improperly connected. If the booster wires 11 and 12 are improperly connected, it will be necessary to reverse the connection of the clamps 13 and 14 in order to obtain the proper connection of the booster wires 11 and 12 which is indicated by the lighting of the green LED 20.

Once the battery clamps 13 and 14 are properly connected, the battery clamp 16 is connected to one of the terminals of the second battery, and then the test probe conductive terminal 35 is brought into contact with the other terminal of the second battery. The green LED 26 indicates proper polarity and the red LED 27 indicates improper polarity of connection. If the red LED 27 lights, the battery clamp 16 must be switched to the other terminal of the second battery for proper polarity. When the green LED 26 lights, the polarity of connection of the battery clamps 16 is proper and the battery clamp 15 can then be connected. Since the battery clamp 15 is the negative connection, then in a negative ground car it can be connected directly to the chassis or the engine block or can be connected directly to the negative terminal of the second battery.

The booster cable assembly 10 is disconnected in a conventional manner when it is desired to disconnect the assembly from the batteries.

By using the polarity indicating means 17 and 25, it is not necessary to determine the polarity of the battery terminals by inspection. In the event that neither of the red or green LED's 20-21 or 26-27 will light, the user of the booster cable assembly 10 is alerted that a potential dangerous condition may exist. The user can then inspect to be sure that good electrical contact is being made by the battery clamps with the battery terminals. In the event that one of the batteries is completely dead the associated LEDS 20-21 or 26-27 will not light. Therefore, the user can very carefully manually determine the proper polarity of connection.

I claim as my invention:

1. A polarity indicating battery booster cable assembly, comprising:
   (a) a pair of booster wires having first ends and second ends,
   (b) first battery attachment means connected to the first ends of the pair of booster wires,
   (c) a first indicating means operatively connected to the first battery attachment means for indicating the polarity of connection of the first battery attachment means,
   (d) a second battery attachment means connected to the second ends of the pair of booster wires, the pair of booster wires providing continuous uninterupted electrical connections between the first and second battery attachment means, and
   (e) a second indicating means operatively connected to one of the booster wires and including a test probe for determining the polarity for connection of the second battery attachment means.

2. A polarity indicating battery booster cable assembly, as defined in claim 1, in which:
   (f) the first indicating means includes:
      1. a first light for indicating one polarity of connection of the first battery attachment means, and
      2. a second light for indicating the opposite polarity of connection of the first battery attachment means, and
   (g) the second indicating means includes:
      1. a first light for determining one polarity of connection of the second battery attachment means, and
      2. a second light for determining the opposite polarity of connection of the second battery attachment means.

3. A polarity indicating battery booster cable assembly, as defined in claim 2, in which:
   (h) the second battery attachment means includes:
      1. a first battery clamp connected to one of the booster wires, and
      2. a second battery clamp connected to the other booster wire, the second battery clamp carrying the test probe.

4. A polarity indicating battery booster cable assembly, as defined in claim 3, in which:
   (i) the test probe includes an electrically conductive terminal electrically connected to the second indicating means and electrically isolated from the second battery clamp.

5. A polarity indicating battery booster cable assembly, as defined in claim 4, in which:
   (j) the second indicating means includes a tracer lead electrically connected to the test probe conductive terminal.

6. A polarity indicating battery booster cable assembly, as defined in claim 5, in which:
   (k) the tracer lead is carried by the said other booster wire.

7. A polarity indicating battery booster cable assembly as defined in claim 6, in which:
   (l) the said other booster wire is the negative wire.

* * * * *